United States Patent
Lamat

(10) Patent No.: US 9,327,820 B2
(45) Date of Patent: May 3, 2016

(54) EMERGENCY OPENING DEVICE FOR AN AIRCRAFT DOOR

(75) Inventor: Patrick Lamat, Toulouse (FR)

(73) Assignee: LATECOERE, Toulose (FR)

( * ) Notice: Subject to any disclaimer, the term of this patent is extended or adjusted under 35 U.S.C. 154(b) by 213 days.

(21) Appl. No.: 14/119,901

(22) PCT Filed: May 29, 2012

(86) PCT No.: PCT/EP2012/002261
§ 371 (c)(1),
(2), (4) Date: Nov. 25, 2013

(87) PCT Pub. No.: WO2012/163513
PCT Pub. Date: Dec. 6, 2012

(65) Prior Publication Data
US 2014/0084600 A1    Mar. 27, 2014

(30) Foreign Application Priority Data
May 31, 2011    (FR) ...................................... 11 54740

(51) Int. Cl.
*E05B 65/10*    (2006.01)
*B64C 1/14*     (2006.01)

(52) U.S. Cl.
CPC .............. *B64C 1/1423* (2013.01); *B64C 1/1407* (2013.01); *E05B 65/10* (2013.01); *Y10T 292/0908* (2015.04)

(58) Field of Classification Search
USPC ........................................................ 292/92
See application file for complete search history.

(56) References Cited

U.S. PATENT DOCUMENTS

| | | | | |
|---|---|---|---|---|
| 2,261,652 A | * | 11/1941 | La Mere ................. | E05F 1/105 16/66 |
| 2,942,828 A | * | 6/1960 | Kondrat ............ | A47G 23/0258 248/145.6 |
| 4,071,271 A | | 1/1978 | Bourrie | |
| 4,801,163 A | * | 1/1989 | Miller ................ | E05B 65/1073 292/201 |
| 5,289,615 A | * | 3/1994 | Banks ................... | B64C 1/1407 16/366 |
| 5,735,557 A | * | 4/1998 | Harvey ................... | F02K 1/766 239/265.29 |
| 5,738,303 A | * | 4/1998 | Hamatani .............. | B64D 25/14 244/129.1 |
| 5,960,674 A | * | 10/1999 | Brockmeyer ........... | F16F 1/041 267/64.12 |
| 6,059,231 A | | 5/2000 | Dessenberger | |

(Continued)

FOREIGN PATENT DOCUMENTS

| | | |
|---|---|---|
| EP | 0741073 | 11/1996 |
| EP | 1300334 | 4/2003 |

(Continued)

*Primary Examiner* — Mark Williams
(74) *Attorney, Agent, or Firm* — Defillo & Associates, Inc; Evelyn A Defillio

(57) ABSTRACT

The invention relates to an emergency opening device for an aircraft door provided with an opening mechanism (10, 11, 17), said device comprising (i) a mobile maneuvering member (21-23, 35) urged by elastic compression means (20) and provided with an end piece (35) connecting to the opening mechanism of the door, and an opposing resetting end segment; and (ii) a member (26) for retaining the resetting segment (23) of the maneuvering member, comprising jaws (26a, 26b) that can move between a closed position in which the resetting segment is locked, in a maneuvering member position in which the elastic means (20) are compressed, and an open position in which the resetting segment is released, thereby allowing the movement of the maneuvering member under the resultant force from the expansion of the elastic means (20).

10 Claims, 3 Drawing Sheets

(56) References Cited

U.S. PATENT DOCUMENTS

| | | | | |
|---|---|---|---|---|
| 6,457,675 B1 * | 10/2002 | Plude | B64C 1/1415 244/129.5 |
| 6,837,461 B1 * | 1/2005 | Shiao | B64C 1/1407 244/129.5 |
| 7,146,766 B2 * | 12/2006 | Finkelstein | E05F 1/1091 16/84 |
| 7,309,087 B2 * | 12/2007 | Lane | E05B 85/10 292/216 |
| 8,424,929 B2 * | 4/2013 | Baragano Gonzalez | E05B 47/00 292/92 |
| 2006/0065778 A1 | 3/2006 | Kannapell | |
| 2014/0259936 A1 * | 9/2014 | DeNormand | E05D 15/22 49/150 |

FOREIGN PATENT DOCUMENTS

| | | |
|---|---|---|
| FR | 2830564 | 4/2003 |
| FR | 2864021 | 6/2005 |

* cited by examiner

EMERGENCY OPENING DEVICE FOR AN AIRCRAFT DOOR

CROSS REFERENCE TO RELATED APPLICATION

This application is a national stage entry of PCT/EP2012/002261 filed May 29, 2012, under the International Convention claiming priority over French Patent Application No. 1154740 filed May 31, 2011.

FIELD OF THE INVENTION

The invention relates to an emergency opening device for an aircraft door having an opening mechanism.

BACKGROUND OF THE INVENTION

Aircraft doors which are designed to allow emergency evacuation of passengers conventionally comprise an emergency opening device designed to be activated during an emergency evacuation procedure so as to open the doors quickly without the need for human intervention.

Such opening devices conventionally comprise means for actuating the door opening mechanism, wherein these means can be switched between a passive state and an active state of activation of said opening mechanism, and means for activating the actuating means.

Currently, as described in particular in patent applications FR 2830564 and EP 0 741 073, the actuation means conventionally consist of an actuator (or driving element) of the pneumatic type, supplied by means of an auxiliary reserve of driving fluid.

However, such actuation means have several drawbacks. Indeed, first and foremost, they prove to be relatively bulky and heavy, in particular due to the presence of the auxiliary reserve of driving fluid. Moreover, they require that the driving fluid pressure be checked periodically, and that the auxiliary reserve be replaced periodically even if it has not been used. Finally, after the emergency opening device has been activated, these actuation means require, in order to be operational once again, that the auxiliary reserve of driving fluid be replaced.

Another current solution, described in particular in patent application FR 2 864 021, makes it possible to reduce the bulkiness and the weight of the actuation means. Indeed, according to this solution, the actuation means consist of a pyrotechnic actuator, i.e. an autonomous actuator which does not require a driving fluid supply source. However, such pyrotechnic actuators must be inspected and replaced periodically, even when they have not been used. Moreover, these pyrotechnic actuators must also be replaced after activation of the emergency opening device.

SUMMARY OF THE INVENTION

The present invention aims to alleviate the drawbacks of the current emergency opening devices for aircraft doors, and aims first of all to provide an emergency opening device whose actuation means are of reduced weight and bulkiness and consist of mechanical actuation means which require neither maintenance when the opening device has not been used nor replacement of any member subsequent to an activation of said opening device.

Another object of the invention is to provide an emergency opening device designed such that it can be rearmed and immediately operational after an activation of said opening device.

To that end, the invention relates to an emergency opening device for an aircraft door having an opening mechanism, comprising means for actuating the opening mechanism, wherein these means can be switched between a passive state and an active state of activation of said opening mechanism, and means for activating the actuating means, and, according to the invention, this emergency opening device is characterized in that:

the actuating means comprises:

a movable operating member having an end-piece, for connecting to the opening mechanism of the door, and at the opposite end a tubular segment termed a rearming segment, elastic compression means arranged between a stationary end-stop element and the connecting end-piece of the operating member, a member for retaining the rearming segment of the operating member comprising at least two jaws which can be moved between a closed position locking the rearming segment, the operating member being in a position which corresponds to the passive state of the actuation means in which the elastic means are held in a compressed state, and an open position freeing said rearming segment, allowing the operating member to be moved, by the force resulting from the expansion of the elastic means, toward a position corresponding to the active state of the actuation means, the activation means are designed to drive the opening of the jaws of the retaining member.

According to the invention, the actuation means are thus entirely mechanical and require no driving fluid in order to be activated. As a result of this design and this mode of operation, such actuation means are therefore of reduced weight and bulkiness with respect to the current pneumatic actuation means.

Moreover, such actuation means comprise no element or substance—such as driving fluid or pyrotechnic charge—which might degrade over time, and they thus require no maintenance.

Finally, activating the opening device involves no consumption of any substance and no adverse effect on any constituent member of the actuation means, such that, after activation, said opening device can quickly be operational once more.

According to one advantageous embodiment of the invention, the jaws of the retaining member are held in their closed position, against the force exerted by elastic means, by means of a brace which surrounds said jaws, and the activation means comprise means for holding the brace in its position wrapped around the jaws, which means are designed to release said brace on command.

Moreover, the means for holding the brace advantageously comprise an electromagnet having a trigger arranged so as to engage with a latching element formed at one of the free ends of said brace, and electrical supply means designed to energize said electromagnet on command so as to free the latching element of the brace.

Furthermore, the rearming segment of the operating member advantageously comprises an operating end-piece designed such that said operating member can be gripped using a tool designed to engage with said operating end-piece in order to rearm the actuation means.

Moreover, according to one advantageous embodiment of the invention:

the rearming segment of the operating member comprises a threaded rod mounted so as to be able to rotate about its axis of revolution and having an operating end-piece designed to allow said rod to be driven in rotation, the jaws of the retaining member delimit, in their closed position, a tapped bore which mates with the threaded rod of the rearming segment of the operating member, the retaining member and the operating member being arranged and designed such that at least one segment of the threaded rod extends into the bore of the retaining member for every position of the operating member.

Such dispositions make it possible to "rearm" the actuation means which can thus be operational immediately after an activation of said opening device.

It should further be noted that the threaded portion of the rearming segment, associated with the tapped portion of the bore of the jaws, results in a very large retaining force; as a consequence, it is possible to use elastic means having a substantial preload.

Advantageously, according to the invention, the operating end-piece of the rearming segment of the operating member consists of a blind bore forming a predetermined imprint.

According to another advantageous embodiment of the invention, the retaining member features jaws which are designed such that said retaining member has the general shape of a nut.

Moreover, the operating member advantageously consists, according to the invention, of a piston, around which extend the elastic means, wherein said piston has a connecting end-piece constituting an end-stop for said elastic means and wherein, at the other end from said connecting end-piece, the rearming section extends from said piston.

The stationary end-stop element of the elastic means, for its part, advantageously consists, according to the invention, of a tubular spacer, the retaining member being attached in a line with said spacer.

Such dispositions make it possible in particular to produce, advantageously, an emergency opening device designed to be integrated into an arm of an aircraft door, which arm is articulated about two shafts which are respectively mounted on said aircraft and said door, to provide for the actuation of an opening mechanism designed to force said arm to pivot.

Moreover, such an opening device can advantageously be designed so as to consist of a finished product forming a "mechanical actuator" which is operational directly after the electromagnet has been connected to an electrical source.

BRIEF DESCRIPTION OF THE DRAWINGS

Other features, objects and advantages of the invention will emerge from the following detailed description, with reference to the appended drawings depicting a preferred embodiment as a non-limiting example, in which.

DETAILED DESCRIPTION OF THE INVENTION

Figure 1:
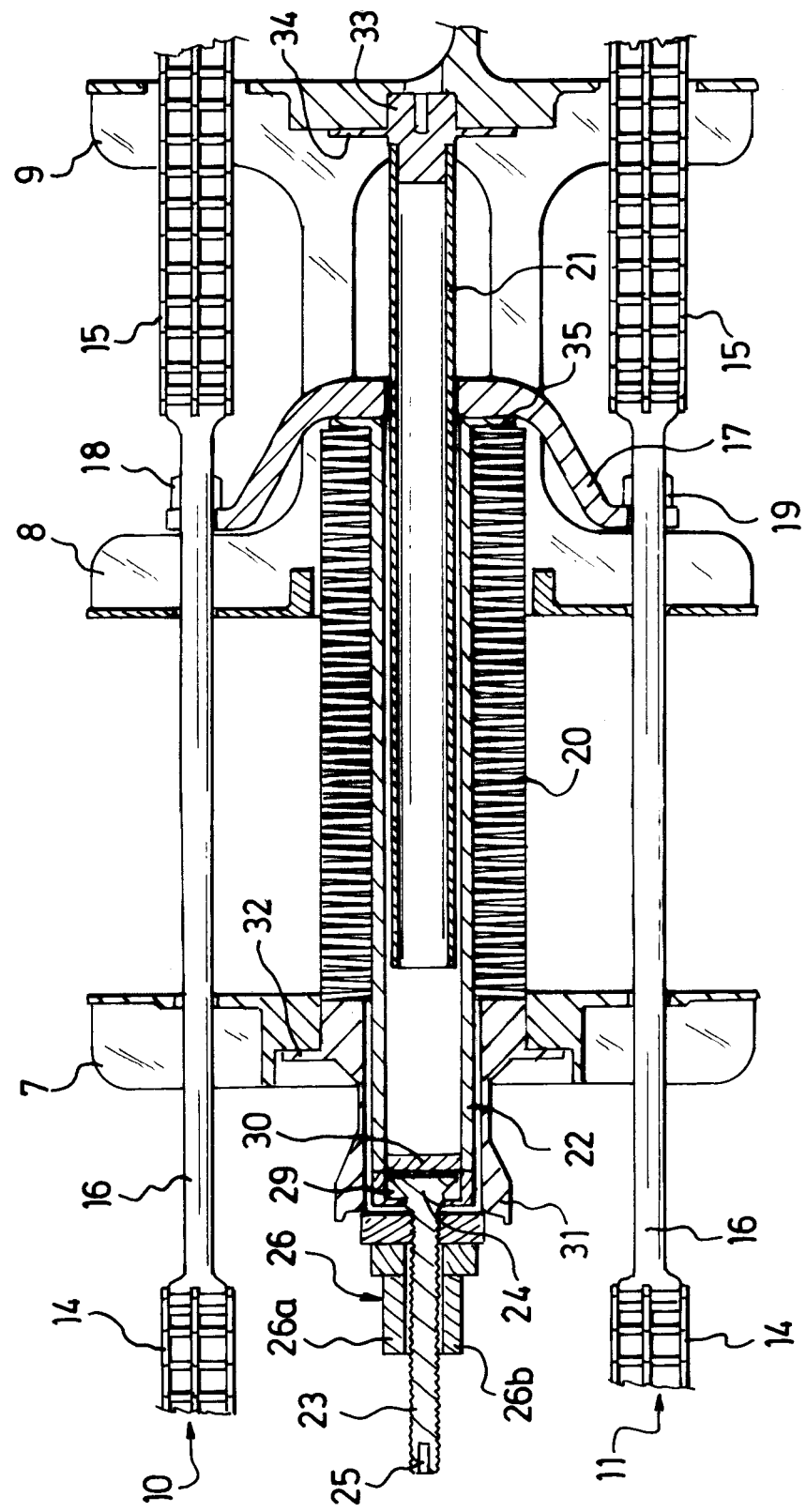
FIG. 1 is a view, through plane A of FIG. 3, of part of an opening mechanism of an aircraft door associated with an emergency opening device according to the invention, in the passive state of the latter.
Figure 2:
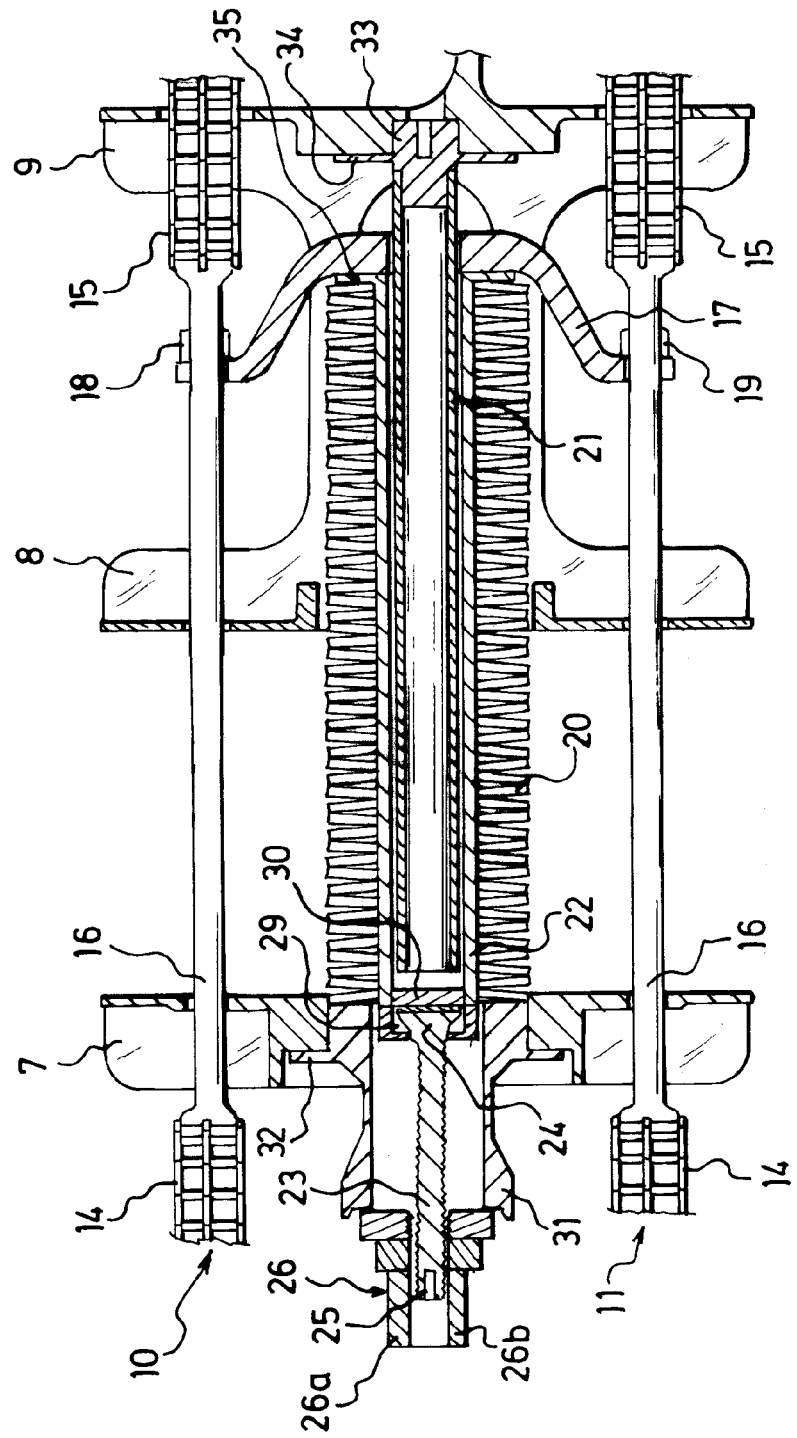
FIG. 2 is a view, through plane A, of part of this opening mechanism associated with an emergency opening device according to the invention, in the active state of the latter.
Figure 3:
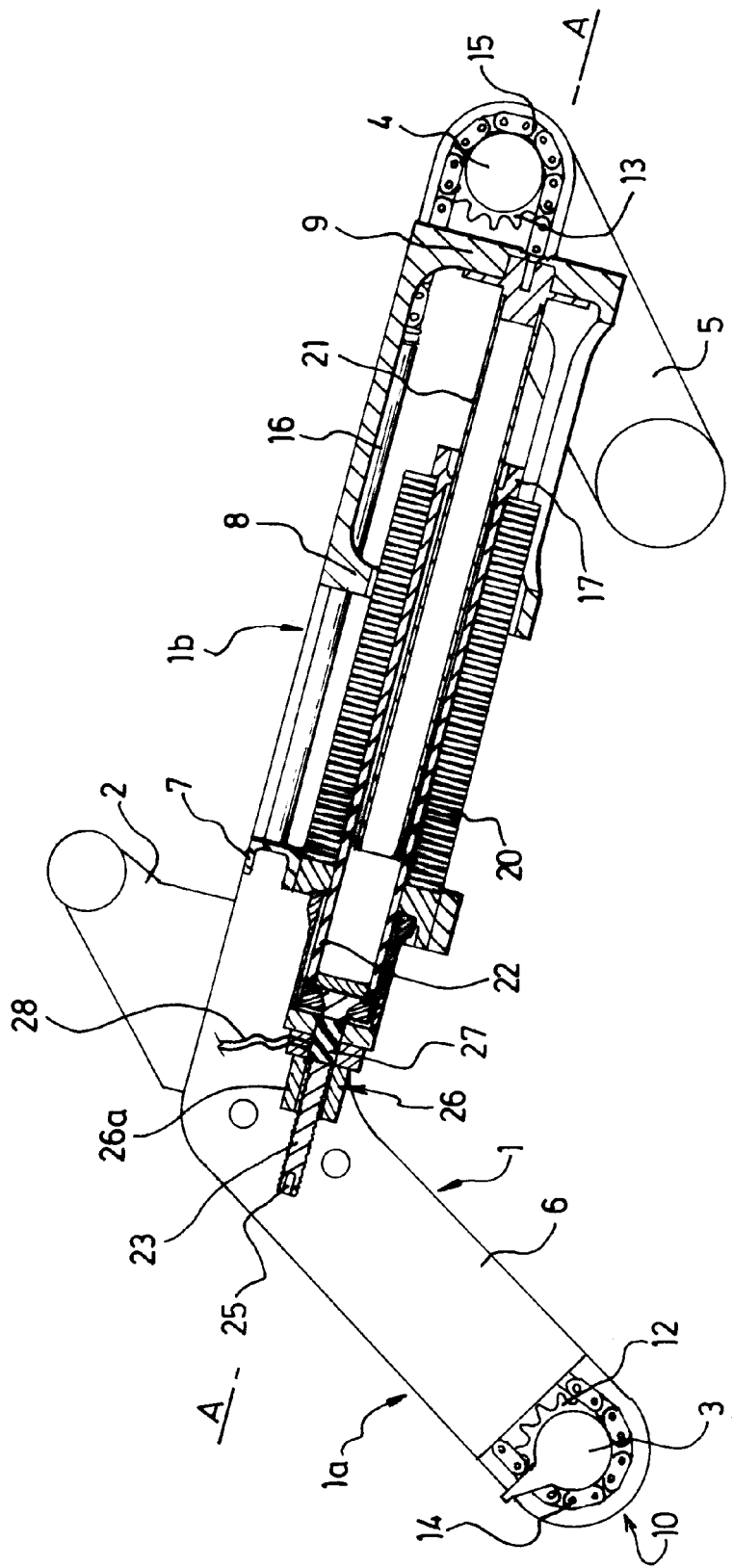
FIG. 3 is a view from above, with partial cutaways, of an articulated arm of an aircraft door fitted with an emergency opening device in accordance with the invention.

The emergency opening device according to the invention is shown, as an example, integrated into a V-shaped elbowed arm 1 comprising:

a shorter straight branch 1a whose free end is mounted so as to be able to rotate about a shaft 3 which is secured to the fuselage of the aircraft (not shown), a longer straight branch 1b, in which the emergency opening device is integrated, whose free end is mounted so as to be able to rotate about a shaft 4 which is secured to the door of the aircraft (not shown), for example by means of a set of articulated rods 5.

This arm 1 is, moreover, of the mechanically welded type and chiefly comprises two parallel longerons such as 6 connected by means of spacers such as 7, 8 and 9 distributed along each of the branches 1a, 1b of said arm.

Moreover, a handle 2 for manually actuating the arm 1 is secured to the branch 1a of said arm.

This arm 1 also integrates a mechanism for connecting the two shafts 3 and 4 in rotation, this mechanism comprising two superposed chain sets 10, 11, each meshing with sprockets 12, 13 which are respectively secured to the shafts 3 and 4 and with return sprockets (not shown) which are arranged at the top of the elbowed arm 1.

Each of these chain sets 10, 11 consists, moreover, of two chain strands 14, 15 which are connected to one another by means of two tie rods such as 16 which are adjustable in length so as to be able to adjust the tension of said chains.

In a manner known per se, the pivoting movement of the arm 1, actuated manually by means of the handle 2, drives the two chain sets 10, 11 in translation and forces the door to pivot, wherein the door remains parallel to its initial closed position as it pivots.

The arm 1 further integrates a pusher member 17 in the form of a crossbow whose ends are mounted so as to slide along two superposed tie rods 16 each belonging to one chain set 10, 11.

Moreover, this pusher member 17 is arranged so as to abut against two end-stops, respectively 18, and 19, each of which is secured to one of the aforementioned tie rods 16.

The emergency opening device according to the invention is designed to actuate the above-described opening mechanism comprising the arm 1, the two chain sets 10, 11 and the pusher member 17, wherein this actuation consists in displacing the pusher member 17 positioned pressing against the end-stops 18, 19 so as to drive the two chain sets 10, 11 in translation and thus to force the door to pivot.

This emergency opening device comprises, in the first instance, actuation means constituting a "mechanical actuator".

These actuation means comprise, in the first instance, a telescopic tubular core comprising:

a tubular guiding shaft 21 designed to extend through an opening created in the pusher member 17 and having, at one of its ends, a stopper 33 around which extends a plate 34 for attaching said guiding shaft to the spacer 9 of the arm 1 located downstream of the pusher member 17, an outer tubular shaft 22 mounted so as to slide along the guiding shaft 21, having an outer flange 35 for abutting against the pusher member 17 at one of its ends, and having a threaded rod 23 extending in line with it from its other end.

Moreover, the threaded rod 23 comprises a hemispherical head 24 housed in the sliding shaft 22 and held, such that it cannot move in translation, between a washer 30, against which it comes to press with interposition of a Circlip® (not shown), and a seat 29 defining a hemispherical bearing surface allowing the threaded rod 23 to rotate about its axis of revolution.

The threaded rod also comprises, at the other end from the head 24, an operating end-piece 25 consisting of a blind bore forming a predetermined imprint.

The actuation means also comprise elastic compression means 20 arranged about the sliding shaft 22, consisting in this example of a stack of Belleville washers.

These actuation means further comprise a tubular spacer 31 inside which the threaded rod 23 extends, said tubular spacer having an end portion which is adapted to be housed in an opening created in a spacer 7 of the arm 1 located upstream of the pusher member 17, and in order to form an annular end-stop for the elastic means.

This tubular spacer 31 further comprises an outer flange 32 forming a plate for attaching to the aforementioned spacer 7 of the arm 1.

Finally, the actuation means comprise a member 26 for retaining the threaded rod 23, wherein this retaining member is secured to the tubular spacer 31 such that it extends from and in a line with the latter in the upstream direction.

This retaining member 26 comprises jaws 26a, 26b which can be moved between a closed position locking the threaded rod 23, the sliding shaft 22 being a position which corresponds to the passive state of the actuation means, in which the elastic means 20 are held in a compressed state between the tubular spacer 31 and the flange 35, and an open position freeing said threaded rod, allowing the elastic means 20 to expand, and driving the displacement of the pusher member 17, causing the two chain sets 10, 11 to subsequently move in translation and causing the door to pivot.

As an advantageous exemplary embodiment, this retaining member 26 is of the type described in patent application EP 2 279 120, which is considered to be an integral part of the present description and corresponds preferably to the embodiment described in this patent application, with reference to FIG. 12, and comprising in particular:

three jaws 26a, 26b delimiting a tapped bore which mates with the threaded portion of the threaded rod 23, these jaws being held in their closed position, against the force exerted by elastic means, by means of a brace which surrounds said jaws, means for holding the brace in its position wrapped around the jaws 26a, 26b, comprising an electromagnet 27 having a trigger arranged so as to engage with a latching element formed at one of the free ends of said brace, said electromagnet being connected by supply cables 28 to an electrical source designed to energize this electromagnet 27 on command so as to free the latching element of the brace.

Such a retaining member 26 makes it possible, in the first instance, in particular by virtue of the threaded rod/tapped bore assembly, to use elastic means 20 having a substantial preload which is capable of opening the door rapidly.

Moreover, this retaining member makes it possible to rearm the actuation means, once these have been used, by means of a tool designed to engage with the operating end-piece 25 of the threaded rod 23, such that it is possible to screw the latter into the retaining member 26.

The emergency opening device described above thus comprises actuation means consisting of a rearmable, electrically triggered "mechanical actuator" which, on one hand, is lightweight and compact and, on the other hand, requires no monitoring or maintenance.

Moreover, by virtue of the design of these actuation means a large opening force is obtained which is capable, in particular, of producing a very rapid opening.

What is claimed is:

1. An emergency opening device for an aircraft door having an opening mechanism (10-19), the opening mechanism comprising:

an actuating device (20-26) for actuating the opening mechanism, wherein the actuating device is switched between a passive state and an active state of activation of said opening mechanism, and an activating device (27, 28) for the actuating device:

the actuating device comprises:

a movable operating member (21-23, 35) having an end-piece (35), for connecting to the opening mechanism (10-19) of the door, and at the opposite end a tubular segment (23) termed a rearming segment, an elastic compression device (20) arranged between a stationary end-stop element (31) and the connecting end-piece (35) of the operating member (21-23, 35), a member (26) for retaining the rearming segment (23) of the operating member (21-23, 35) comprising at least two jaws (26a, 26b) which can be moved between a closed position locking the rearming segment (23), the operating member (21-23, 35) being in a position which corresponds to the passive state of the actuating device in which the elastic compression device (20) are held in a compressed state, and an open position freeing said rearming segment, allowing the operating member (21-23, 35) to be moved, by the force resulting from the expansion of the elastic compression device (20), toward a position corresponding to the active state of the actuating device, the activation device (27, 28) is designed to drive a triggering element which, from an arrangement to engage a latching element of a linking device which holds the two jaws (26a, 26b) in their closed position against the elastic compression device, frees the latching element from this arrangement to release the opening of the jaws (26a, 26b) of the retaining member (26) to their open position.

2. The emergency opening device as claimed in claim 1, wherein:

the jaws (26a, 26b) of the retaining member (26) are held in their closed position, against the force exerted by elastic compression device, by a brace which surrounds said jaws, the activation device comprises a holding device (27) for holding the brace in a position wrapped around the jaws (26a, 26b), the holding device is designed to release said brace on command.

3. The emergency opening device as claimed in claim 2, wherein the holding device comprises an electromagnet (27) having a trigger arranged so as to engage with a latching element formed at one of the free ends of said brace, and electrical supply device (28) to energize said electromagnet on command so as to free the latching element of the brace.

4. The emergency opening device as claimed in claim 1, wherein the rearming segment (23) of the operating member (21-23, 35) comprises an operating end-piece (25) designed such that said operating member can be gripped using a tool designed to engage with said operating end-piece in order to rearm the actuation device.

5. The emergency opening device as claimed in claim 4, wherein:

the rearming segment of the operating member (21-23, 35) comprises a threaded rod (23) mounted so as to be able to rotate about its axis of revolution and having an operating end-piece (25) designed to allow said rod to be driven in rotation, the jaws (26a, 26b) of the retaining member (26) delimit, in their closed position, a tapped bore which mates with the threaded rod (23) of the rearming segment of the operating member (21-23, 35), the retaining member (26) and the operating member (21-23, 35) being arranged and designed such that at least one segment of the threaded rod (23) extends into the bore of the retaining member (26) for every position of the operating member (21-23, 35).

6. The emergency opening device as claimed in claim 5, wherein the operating end-piece (25) of the rearming segment (23) of the operating member (21-23, 35) consists of a blind bore forming a predetermined imprint.

7. The emergency opening device as claimed in claim 5, wherein the retaining member (26) features jaws (26*a*, 26*b*) which are designed such that said retaining member has the general shape of a nut.

8. The emergency opening device as claimed in claim 1, wherein the operating member (21-23, 35) includes a piston (22), around which extend the elastic compression device (20), wherein said piston has a connecting end-piece (35) constituting an end-stop for said elastic compression device and wherein, at the other end from said connecting end-piece, the rearming section (23) extends from said piston.

9. The emergency opening device as claimed in claim 8, wherein the stationary end-stop element of the elastic compression device (20) includes a tubular spacer (31), the retaining member (26) being attached in a line with said spacer.

10. The emergency opening device as claimed in claim 1, wherein it is designed to be integrated into an arm (1) of an aircraft door, which arm is articulated about two shafts (3, 4) which are respectively mounted on said aircraft and said door, to provide for the actuation of an opening mechanism designed to force said arm to pivot.

* * * * *